J. G. WALLACE.
ROTARY-CHURN.

No. 191,736. Patented June 5, 1877.

Attest:
C. A. Trow
August Petersohn

Inventor:
James G. Wallace,
by Louis Bagger & Co.
Attys.

UNITED STATES PATENT OFFICE.

JAMES G. WALLACE, OF RICEVILLE, TENNESSEE, ASSIGNOR OF ONE-HALF HIS RIGHT TO EDWARD M. NEWTON, OF SAME PLACE.

IMPROVEMENT IN ROTARY CHURNS.

Specification forming part of Letters Patent No. 191,736, dated June 5, 1877; application filed May 16, 1877.

*To all whom it may concern:*

Be it known that I, JAMES G. WALLACE, of Riceville, in the county of McMinn and State of Tennessee, have invented certain new and useful Improvements in Churn-Dashers; and I do hereby declare that the following is a full, clear, and exact description thereof, which will enable others skilled in the art to which it appertains to make and use the same, reference being had to the accompanying drawings, which form a part of this specification, and in which—

Figure 1:
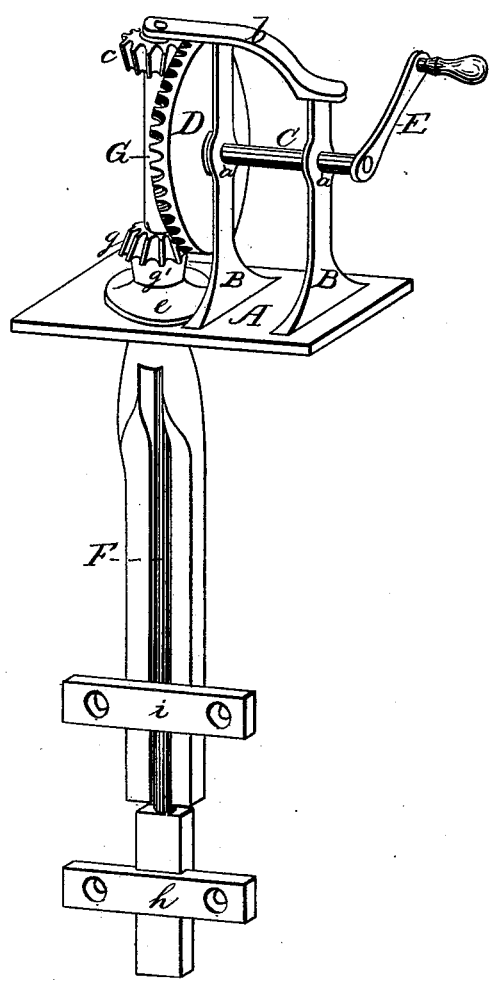
Figure 2:
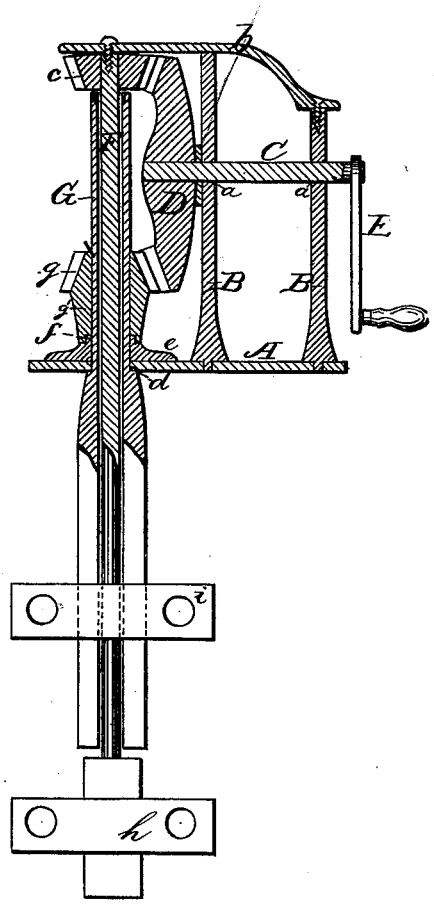

Figure 1 is a perspective view of my improved churn-dasher and its operating mechanism, and Fig. 2 is a vertical section of the same.

Similar letters of reference indicate corresponding parts in both the figures.

The object of my invention is to construct a churn-dasher by which the cream shall be more thoroughly and rapidly stirred and beaten than by the churn-dashers now in common use; and it consists in using two dasher-blades, arranged to rotate in opposite directions, and the mechanism for operating the same, the construction of which I shall now proceed more fully to describe.

In the drawings, A is a board or disk, which, during the operation of churning, serves as a cover for the churn. B B are two uprights affixed therein, and having bearings $a\ a$ for a shaft, C, which is operated by a crank, E, and carries, at its other end, a cog drive-wheel, D. $b$ is a bracket secured to the upper ends of uprights B, and having a bearing for a vertical shaft, F, provided at its upper end with a pinion, $c$, which engages with the cog-wheel D. Board A has a perforation, $d$, around which is placed a flat ring, $e$, having an upward-projecting circumferential flange, $f$. This ring forms a box or bearing for a tubular shaft, G, having a pinion, $g$, which engages with wheel D. The shaft F, above mentioned, passes through the tubular shaft G, and both extend through board A a suitable distance. The pinion $g$ of shaft G has a downward-projecting flange or sleeve, $g'$, which fits around flange $f$ of disk $e$, as shown, thus forming a bearing which retains the shaft in position, and prevents spilling or splattering of the cream when the churn is operated.

The tubular shaft G below board A is wider than above, and is cut out, as shown, so as to form a fork, to which one or more dasher-blades, $i$, are secured, either firmly or adjustably. Another dasher-blade, $h$, is secured to the lower end of shaft F. These dasher-blades may be of any suitable construction.

The operation of my improved churn-dasher will be readily understood from the foregoing description. By the rotation of the cog-wheel D by crank E the shafts F G are rotated in opposite directions, the dasher-blades $h\ i$ thus cutting and stirring the cream very thoroughly, and causing the butter to come in a very short time. Owing to the fork shape of shaft G the dasher is easily cleaned—an object of great importance, as, if it was a perfect tube, cream might adhere to its inside, where it would sour and impart an unpleasant taste to the butter. The gearing for operating the dasher is simple and effective, the pinion $g$ being provided with a flange, $g'$, which works against the ring $e$, forms a bearing with the least possible friction, and serves to retain the shaft G in position; and the complete construction of my improved churn-dasher is simple, and its operation effective.

Having thus described my invention, I claim and desire to secure by Letters Patent of the United States—

1. The combination of the perforated covering-board A, ring $e$ having flange $f$, shaft G, and pinion $g$ having sleeve or flange $g'$, substantially as and for the purpose shown and specified.

2. The improved churn-dasher herein described, consisting essentially of the tubular forked shaft G having dasher-blade $i$, shaft F having dasher-blade $h$, ring $e$ having flange $f$, pinion $g$ having flange $g'$, pinion $c$, and cog-wheel D, all combined, arranged, and operating substantially as described, for the purpose set forth.

In testimony that I claim the foregoing as my own I have hereunto affixed my signature in presence of two witnesses.

JAMES G. WALLACE.

Witnesses:
CALVIN C. DODSON,
GEORGE F. WILSON.